(12) United States Patent
Himmelsbach et al.

(10) Patent No.: US 8,417,726 B2
(45) Date of Patent: Apr. 9, 2013

(54) GUIDED STRUCTURE SYNCHRONIZATION

(75) Inventors: Gerhard Himmelsbach, Mannheim (DE); Winfried Schwarzmann, Waghausel (DE); Gregor Rieken, Walldorf (DE); Stephan Toebben, Walldorf (DE); Jochen Schrempf, Besigheim (DE); Holger Kiefhaber, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 208 days.

(21) Appl. No.: 12/639,772

(22) Filed: Dec. 16, 2009

(65) Prior Publication Data

US 2011/0145298 A1    Jun. 16, 2011

(51) Int. Cl.
*G06F 7/00* (2006.01)
*G06F 17/30* (2006.01)

(52) U.S. Cl. .......................................... 707/792; 707/802

(58) Field of Classification Search ........................ None
See application file for complete search history.

(56) References Cited

U.S. PATENT DOCUMENTS

| | | | |
|---|---|---|---|
| 5,315,709 A * | 5/1994 | Alston et al. ........................... | 1/1 |
| 6,223,187 B1 * | 4/2001 | Boothby et al. ....................... | 1/1 |
| 6,678,882 B1 * | 1/2004 | Hurley et al. ................... | 717/121 |
| 6,795,868 B1 * | 9/2004 | Dingman et al. ............. | 709/246 |
| 7,610,317 B2 * | 10/2009 | Rao et al. ............................... | 1/1 |
| 7,756,882 B2 * | 7/2010 | Aharoni et al. ............... | 707/756 |
| 7,870,016 B2 * | 1/2011 | Fazal et al. ................... | 705/7.36 |
| 7,934,207 B2 * | 4/2011 | Gustafsson et al. ........... | 717/143 |
| 7,958,031 B2 * | 6/2011 | Hunt et al. ........................ | 705/35 |
| 8,006,223 B2 * | 8/2011 | Boulineau et al. ............. | 717/101 |
| 2003/0182461 A1 * | 9/2003 | Stelting et al. ................... | 709/310 |
| 2003/0233249 A1 * | 12/2003 | Walsh et al. ....................... | 705/1 |
| 2004/0225677 A1 * | 11/2004 | Rangadass ..................... | 707/102 |
| 2004/0243453 A1 * | 12/2004 | Call et al. ............................ | 705/7 |
| 2005/0050068 A1 * | 3/2005 | Vaschillo et al. .............. | 707/100 |
| 2005/0137725 A1 | 6/2005 | Scholl et al. | |
| 2006/0004831 A1 * | 1/2006 | Debertin et al. ............... | 707/102 |
| 2006/0004854 A1 * | 1/2006 | Okunseinde et al. ...... | 707/103 Y |
| 2006/0072505 A1 * | 4/2006 | Carrillo et al. ................. | 370/331 |
| 2006/0161879 A1 * | 7/2006 | Lubrecht et al. .............. | 717/101 |
| 2008/0183524 A1 * | 7/2008 | Suresh et al. ....................... | 705/7 |

OTHER PUBLICATIONS

Sun et al., Operation Context and Context-Based Operational Transformation, Nov. 2006, ACM, pp. 279-288.*
Matias, "Automatic generation of a bill of materials based on attribute patterns with variant specification in a customer oriented environment", *Journal of Materials Processing Technology 199*, (2008), 431-436.
Maull, "The role of the bill of materials as a CAD/CAPM interface and the key importance of engineering change control", *Computing & control engineering journal*, (1992), 63-70.
Olsen, "A procedure oriented generic bill of materials", *Computers and Engineering* vol. 32, No. 1, (1997), 29-45.

* cited by examiner

*Primary Examiner* — Charles Kim
*Assistant Examiner* — Jessica N Le
(74) *Attorney, Agent, or Firm* — Blakely, Sokoloff, Taylor & Zafman LLP

(57) ABSTRACT

Method and apparatus for enabling the user to guide the synchronization of a source data structure with a target data structure. The guided synchronization stores the operations defined by the user and reapplies them to future synchronizations.

14 Claims, 4 Drawing Sheets

GUIDED STRUCTURE SYNCHRONIZATION

FIELD OF THE INVENTION

Embodiments of the invention relate to a method and system for synchronizing data structures. Specifically, embodiments of the invention relate to a method and system for guided structure synchronization.

BACKGROUND

In the field of product lifecycle management, product development is managed through a series of interrelated data structures. A data structure is often specific to a development phase. If a subsequent development phase works with a different data structure, and if handover happens consecutively, then an effective synchronization is necessary. For example, a design engineer structures a product from a functional point of view by grouping basic functions that are necessary for a more sophisticated function. In contrast, a manufacturer prefers a structure that directly reflects the order or sequence of assembly. For instance, in hierarchical structures the components and sub-components can be organized as bills of materials.

In one example, a design bill of materials data structure for an airplane organizes the parts of the airplane into a hierarchy where the airplane as a whole product is at the highest level in the hierarchy and the sub-assemblies of the airplane are the fuselage, wings and engines, which are at the next lower level of the data structure hierarchy. Further sub-assemblies follow at lower points in the data structure hierarchy. The parts of the body, the parts of the wings and the parts of the engine are in this next level.

In contrast, a manufacturer organizes the same product of an airplane based on the order of assembly such that the parts of the fuselage and the wing might be grouped together due to their use in an early stage of assembly. Whereas other parts of the wings and engines might be separately grouped together because they are assembled in a separate, but parallel process.

In addition, over time many of the components of the product are changed, upgraded or different versions are utilized. These changes in the data structures over time can affect any component resulting in differences between associated data structures. The associated data structures must be modified to reflect the changes. For example, if an airplane assembly is modified at the design level to have a new engine type after several years of production, then the data structures representing the airplane at the manufacturing level must be updated to reflect the inclusion of the new engine type. A user must guide this modification, because the organization of the manufacturing data structure is based on order of assembly. An automatic conversion is in general not feasible.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least "one."

DETAILED DESCRIPTION

Figure 1:
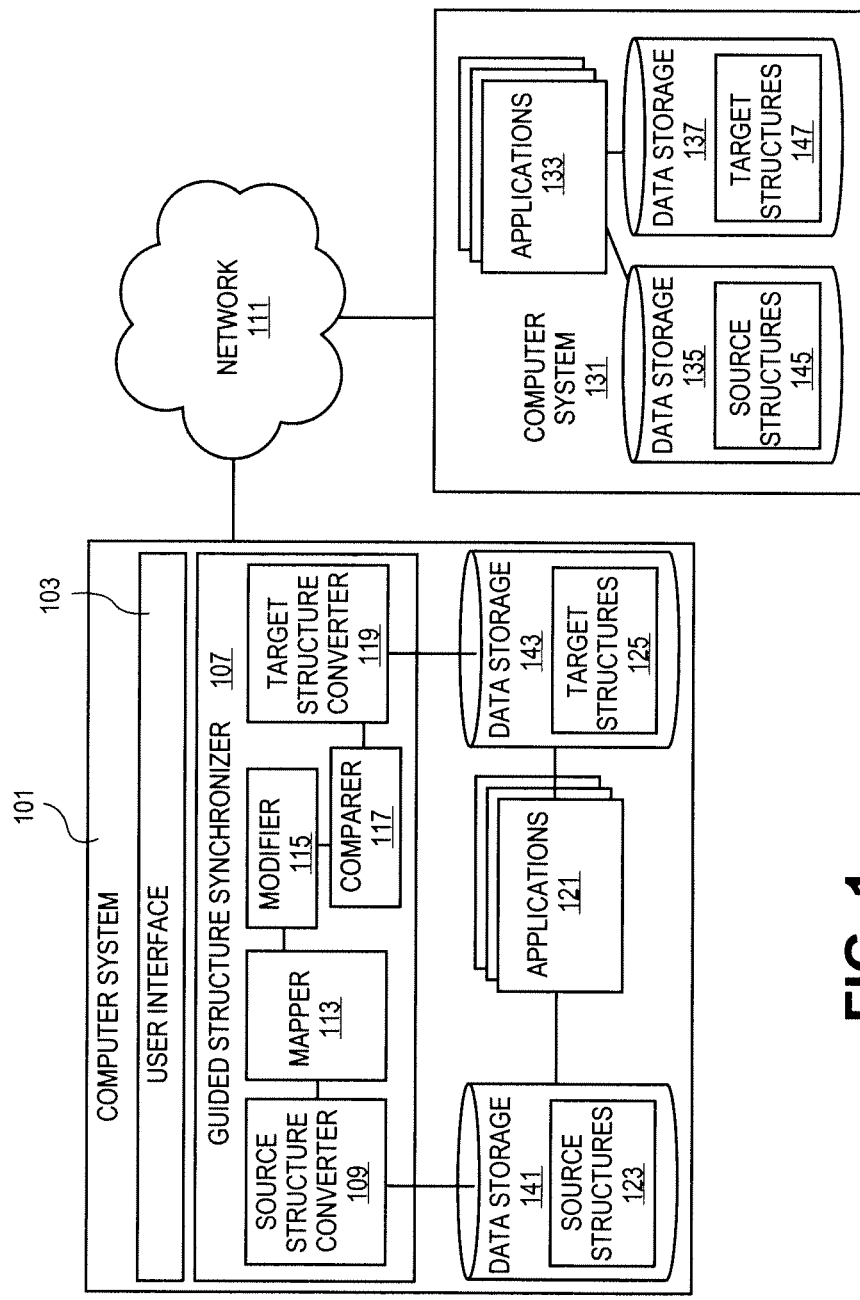
FIG. 1 is a diagram of one embodiment of a system for guided structure synchronization.

FIG. 1 is a diagram of one embodiment of a system for guided structure synchronization. The system may include a set of computer systems 101 and 131. The computer systems 101, 131 can provide a user interface 103, a guided structure synchronizer 107 as well as a set of data storage devices 141, 143. A 'set,' as used herein refers to any positive whole number of items including one item. In one embodiment, the system is implemented in a single computer system 101. In other embodiments, the system is implemented as a distributed system across multiple computer systems 101, 131, communicating over a network 111.

The computer systems 101, 131 can be any type of computer systems including desktop computers, handheld computers, laptop computers, servers, workstations or similar computing devices. The network 111 can be a local area network (LAN), a wide area network (WAN), such as the Internet or similar communication system. For sake of convenience and clarity, a distributed system with two computer systems 101, 131 is illustrated and described. However, one of ordinary skill in the art would understand that the principles, structures and features of the described system can be implemented on any number of networked computer systems.

In one embodiment, a set of applications 121 or similar programs utilize a set of source data structures 123 and target data structures 125. The source structures 123 and target data structures 125 can be used by the same application or program or these data structures 123, 125 can be utilized by different applications and programs. The source data structures 123 and the target data structures 125 can be stored in the same data storage device or in different data storage devices 141, 143. A source data structure 123 and a target data structure 125 may have differing formats, but represent primarily the same set of data. The data formats of each of the structures are optimized or organized for a specific function or process that is different than that of the other data structures. However, for many changes to each data structure it is necessary to synchronize the data in each of these structures to promulgate the changes from one data structure (i.e., the source data structure 123) to the other data structures (i.e., the target data structure 125). The guided structure synchronizer 107 performs this propagation. The changes in the source data structures 123 and target data structures 125 can be represented by separate versions or states of the respective data structures 123, 125. Also, any number of source data structures 123 and target data structures 125 can be present in the system having one to one or similar inter-relationships that may be established by the guided structure synchronizer 107.

In another embodiment, the applications 121, 133 and programs that utilize these data structures 123, 125, 145, 147 can be distributed over multiple computer systems 101, 131 including multiple data storage devices 135, 137, 141, 143 or the applications 121, 133 can utilize any source data structure 123, 145 or target data structure 125, 147 across the distributed system. The guided structure synchronizer 107 can assist in the synchronization of any combination of these local and remote source and target data structures.

In one embodiment, the guided structure synchronizer 107 includes a source structure converter 109, a mapper 113, a modifier 115, a comparer 117 and a target structure converter 119. The guided structure synchronizer 107 can also include a user interface 103 or can interact with a separate program that provides a user interface 103. The guided structure synchronizer 107 updates a target data structure 125 or creates a target structure 125 from a source data structure 123.

The source structure converter 109 receives or retrieves the source data structure 123 and converts it to an intermediate structure that is a standardized model in the guided structure synchronizer 107. The intermediate structure may be referred to as a "source model." Similarly, a target structure converter 119 can retrieve a target structure 125 and convert it into an analogous standardized model for use in the guided structure synchronizer 107. This intermediate structure may be referred to as a "target model." The target structure converter 119 can also perform the reverse function of turning a standardized model into the specific format of the target data structure 125.

A mapper 113 reorganizes the source data structure or source model into the format or organization pattern of the target structure or the target model. This mapped data structure is referred to herein as a "proposed model." A modifier 115 can perform additional functions on the proposed model generated by the mapper 113. These operations can be user defined or can be derived from prior user designated or identified modification operations. A comparer 117 compares a proposed model with a target model to identify differences between the corresponding data structures.

The differences between the data structures along with the entirety of the proposed model can be displayed or provided to a user through the user interface 103. The user interface 103 also receives user input selecting or defining resolutions for conflicts identified by the comparer 117 and other modifications (e.g., reorganization operations) of a proposed model. These changes and modifications are recorded to be reapplied by the modifier 115 during future synchronization operations. The source data structure may be periodically updated and changed and these changes can be synchronized by leveraging the user guidance on previous synchronizations. The user interface 103 can be any type of graphical or non-graphical interface. The user interface 103 can provide a menu-based, drag-and-drop or similar interface for enabling a user to specify operations to be utilized to synchronize the data structures.

Figure 2A:
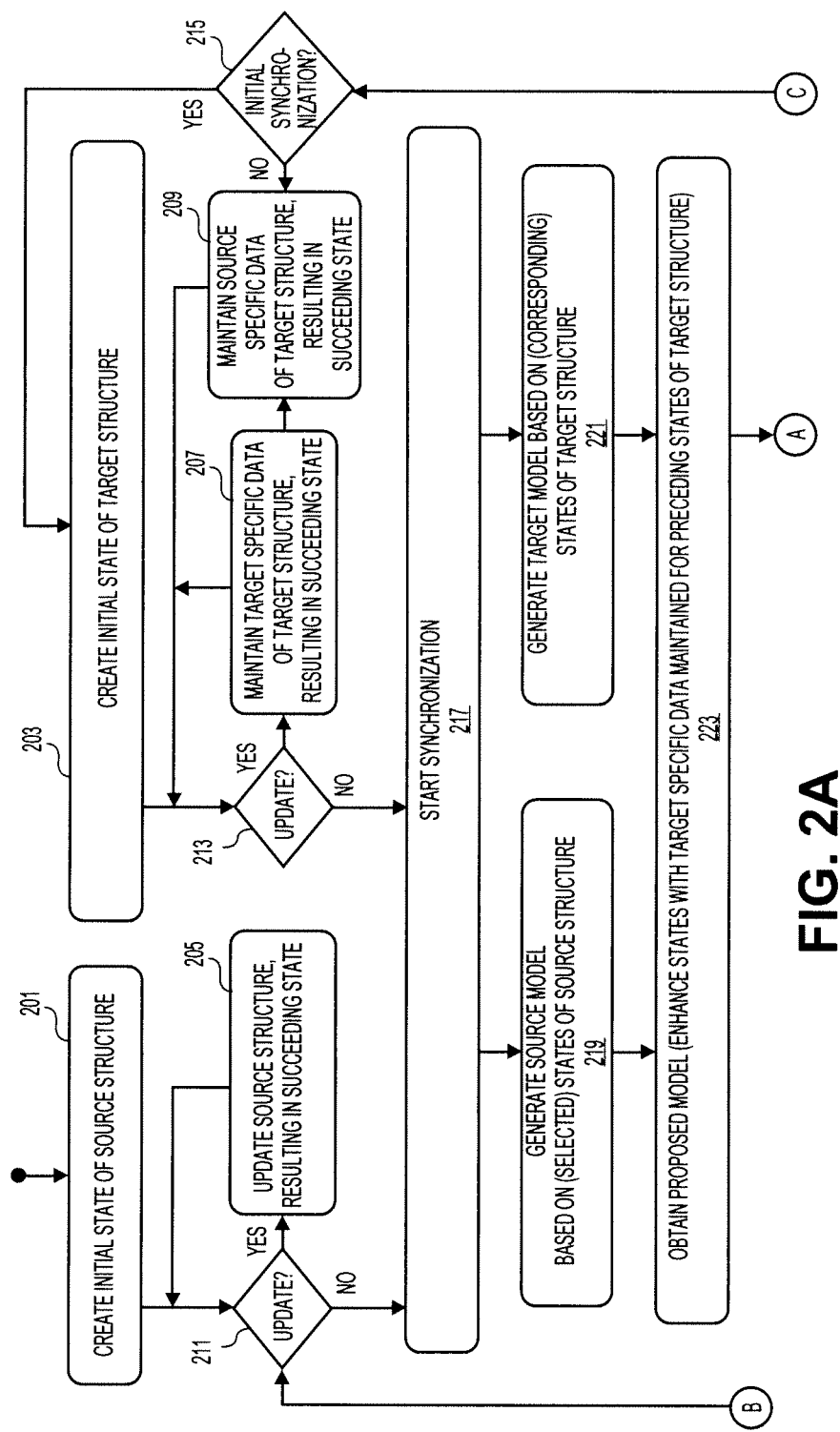
FIGS. 2A and 2B illustrate a flowchart of one embodiment of a guided synchronization method.
Figure 2B:
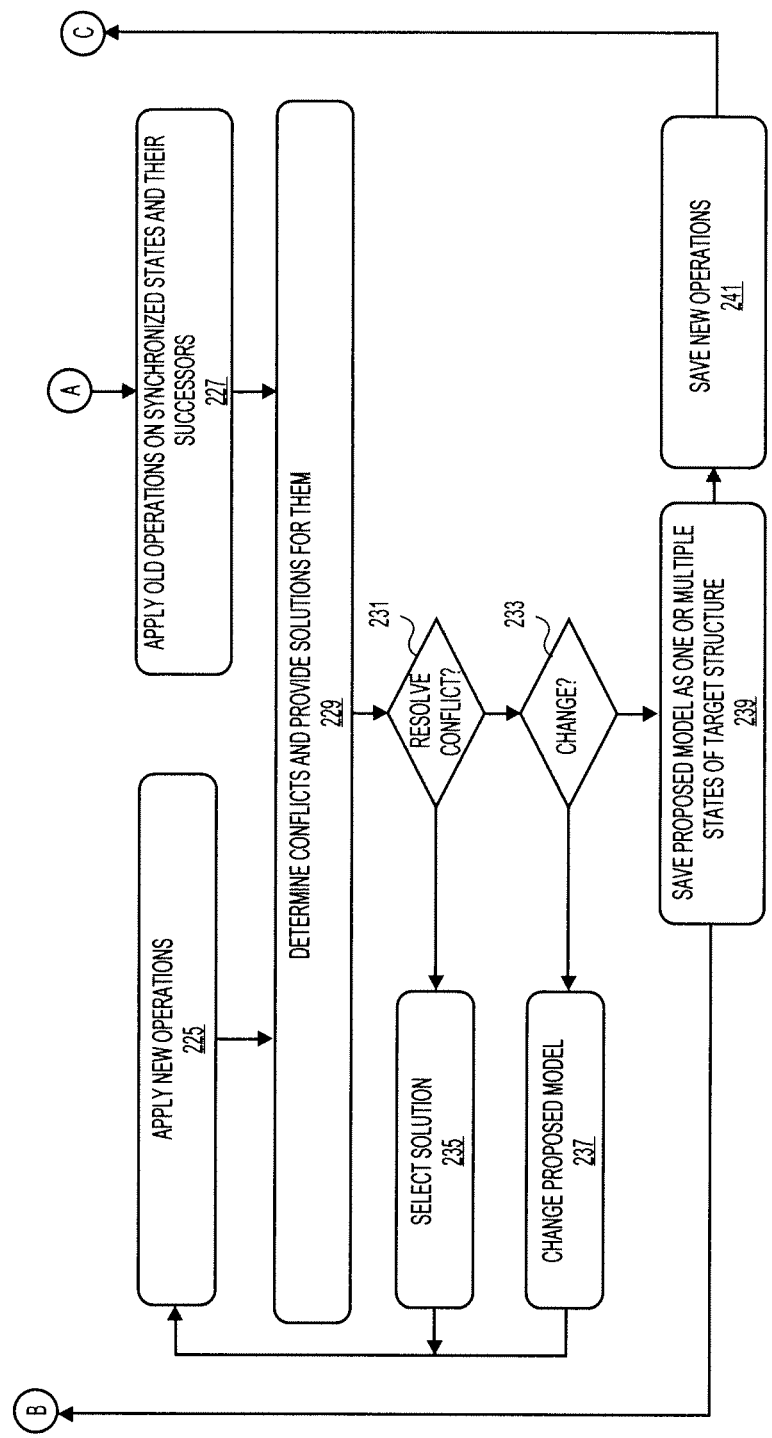

FIGS. 2A and 2B illustrate a flowchart of one embodiment of the synchronization process. The synchronization process is premised on the creation of a source data structure (Block 201). The source data structure can be manually constructed or automatically constructed by any process. The source data structure can have an initial version or state. A user or program can update (Block 211) the source data structure at any point to create a new or succeeding source data structure (Block 205). The succeeding source data structure is stored as new state or version of the source data structure. A similar process can bring a target data structure into existence (Block 203). The target data structure can be created by a manual or automated process. The target data structure can be created by an initial synchronization process. If the target data structure is updated (Block 213), then a succeeding state or version is created (Block 207). A succeeding state or version can also be created as a result of synchronization (Blocks 215, 209).

The synchronization process can be initiated by a user or automated detection of a change in a source data structure (Block 217). The process then continues by retrieval and conversion of a source data structure (Block 219). The source data structure is converted to a source model. A model is a normalized internal representation of a data structure. For example, this normalization allows for the application independent comparison of two data structures and in connection with the normalization of modifications into operations, the storage and reapplication of user-driven changes. In parallel the target model may be constructed if a target data structure exists (Block 221). This target model is constructed by retrieving an existing target data structure and converting it to a normalized internal representation analogous to the source model. One skilled in the art would understand that the use of a source model and target model is optional and for a specific synchronization application the source data structure and target data structure can be utilized in their place.

After the source model has been constructed, a proposed model is constructed (Block 223). The proposed model is constructed by reorganization of the source model into the organizational pattern or format of the target model. The proposed model is also updated or modified based on operations defined or selected in previous synchronization operations (Block 227). In one embodiment, no separate proposal model is constructed. Instead, the mapper 113 updates the target model while traversing the source model, and subsequently, the updated target model serves as proposed model (e.g. in the interaction with a user).

A comparison of the proposed model and the target model is then executed and utilized to identify conflicts (Block 229). The proposed model is also provided to the user to identify where conflicts occur, or to allow the user to define or select operations to apply to the proposed model. At any time, the user interface allows the user to resolve a conflict (with one of the provided solutions) (Block 231) or to restructure the proposed model (Block 233). The user interface provides solutions that are internally represented as sequences of (normalized) operations. Selecting a solution directly results in applying the corresponding sequence of operations to the proposed model (Blocks 235, 225). In the restructuring case, a change performed by a user on the displayed proposed model is transformed into a sequence of operations before being applied to the proposed model (Blocks 237, 225).

Before saving or after each application of an operation sequence, a check is made to determine if all the conflicts have been resolved (Block 229). If this is the case, and the user is done with the restructuring, then the proposed model can be saved as a new version or state of the target data structure (Block 239). Any new operations (that have been designated) are saved as well (Block 241). This process continues until all conflicts have been resolved and the user is satisfied that all the restructuring has been completed (Blocks 229, 231 and 235 or 233 and 237, 225).

Figure 3:
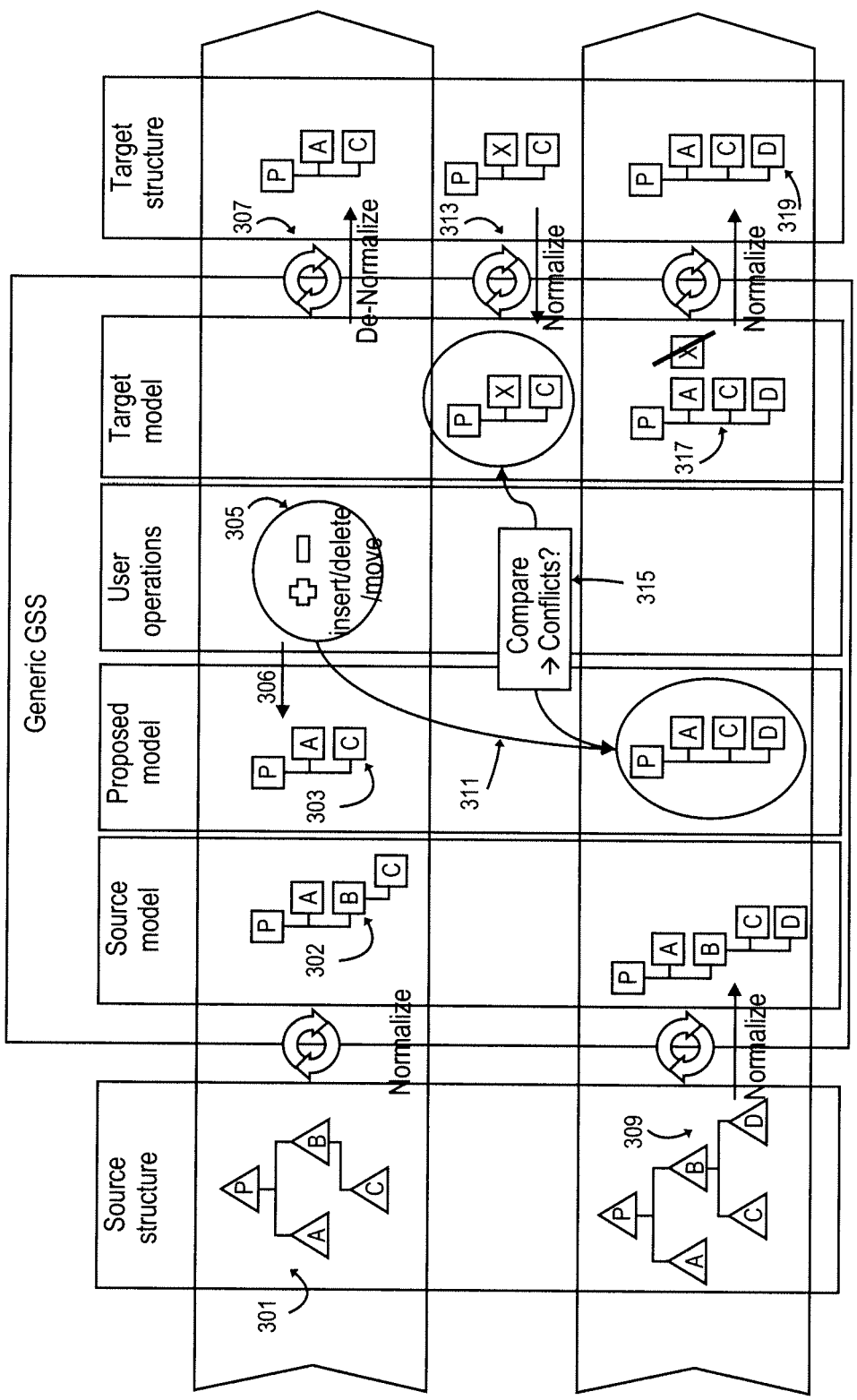
FIG. 3 is a diagram of one example application of a guided structure synchronization.

FIG. 3 is a diagram of one example application of the guided structure synchronization. In the example, a source data structure is provided 301 that needs to be initially synchronized to a new target data structure. In the first phase, the source data structure 301 is normalized to a source model 302. The proposed model 303, as constructed by the mapper 113, is a reorganization of the source data structure 301 into the format or organization of target data structures.

The user then examines the proposed model and specifies a set of modifications 305 to be applied to the proposed model 303 (step 306). These modifications can represent inserts, deletes, moves or similar operations on objects and relations (i.e., restructuring). The operations can further modify the content (e.g., attribute values) of the proposed model 303. During a save, the proposed model 303 is de-normalized to a specific target data structure (step 307).

In this example, an addition of an element to the source data structure 309 initiates a subsequent synchronization. The changed source data structure is again normalized to a source model, and then mapped to a proposed model (having the same format as the target model). The proposed model is also modified by application of previously defined user operations 305 (step 311).

On the other hand, the target data structure may also have been modified since the last synchronization (e.g., replacing object A by object X in this relation). This target data structure is normalized in step 313 into a target model to enable the easy comparison of the proposed model and the target model (step 315). The user decides on how each of the conflicts is to be resolved and defines any other additional modifications that are to be done to the proposed model. The resolution of a conflict may also result in a modification of the target model 317 (e.g., removing relation to object X) if a conflict can be resolved in favor of the proposed model (e.g., the following comparison 315 will no longer identify this conflict). Eventually, the saving of the proposed model either results in updating the target data structure of step 313 or creating a successor state 319 thereof. This completes the synchronization.

In one embodiment, the guided synchronization system can be implemented as a set of hardware devices. In another embodiment, the system components are implemented in software (for example microcode, assembly language or higher level languages). These software implementations can be stored on a computer-readable medium. A "computer-readable" medium can include any medium that can store information. Examples of the computer-readable medium include a read only memory (ROM), a floppy diskette, a CD Rom, a DVD, a flash memory, a hard drive, an optical disc or similar medium.

In the foregoing specification, the invention has been described with references to specific embodiments. It will, however, be evident that various modifications and changes can be made thereto without departing from the broader spirit and scope that is set forth in the appended claims. The specification and drawings are accordingly to be regarded in illustrative rather than a restrictive sense.

What is claimed is:

1. A method comprising:
   generating a source model based on a source data structure and a source data structure format;
   generating a target model based on a stored target data structure and the target data structure format in a preceding synchronization or a resulting from updating specific synchronized data;
   obtaining a proposed model based on mapping a relationship between the source model and the target model;
   receiving, from a user, information specifying a change to the proposed model, wherein the information presenting the change to the proposed model includes an operation specifying at least one of inserting, deleting, or changing a relation or an attribute of objects of the proposed model;
   determining, by a computing processor, a conflict based on a comparison of the proposed model and the target model, wherein the determined conflict includes at least one of finding an object which has not been part of the target model in the preceding synchronization, or finding an object of the preceding synchronization which is no longer part of the proposed model, wherein the found object includes a relationship being part of the proposed model and the target model or an attribute having different values in the proposed model and the target model;
   presenting the determined conflict and solutions to resolve the determined conflict to the user via an graphical user interface, wherein the solutions are represented as a sequence of operations on the proposed model;
   selecting a solution of the solutions from the user to resolve the determined conflict;
   applying the selected solution to at least one of the target model or the proposed model to resolve the conflict; and
   storing an operation representing the change to the proposed model; and
   storing the proposed model after making the change as a new version or a second state in the target data structure.

2. The method of claim 1, further comprising:
   maintaining target specific additional data after the preceding synchronization.

3. The method of claim 1, further comprising:
   transferring target specific data from the target data structure to the proposed model.

4. The method of claim 1, further comprising:
   storing the mapped relationship between the object of the source model and the object of the proposed model.

5. The method of claim 1, wherein the information includes any one of an operation stored during the preceding synchronization, the solution to the conflict selected by the user or a computer system in response to presenting the conflict, or an input by the user through the user interface in response to a review of the proposed model.

6. A system comprising:
   a memory device to store data;
   a processor coupled to the memory device to execute a guided structure synchronizer to configure:
   generating a source model based on a source data structure and a source data structure format;
   generating a target model based on a stored target data structure and the target data structure format in a preceding synchronization or a resulting from updating specific synchronized data;
   obtaining a proposed model based on mapping a relationship between the source model and the target model;
   receiving, from a user, information specifying a change to the proposed model, wherein the information presenting the change to the proposed model includes an operation specifying at least one of inserting, deleting, or changing a relation or an attribute of objects to the proposed model;
   determining, by a computing processor, a conflict based on a comparison of the proposed model and the target model, wherein the determined conflict including at least one of finding an object which has not been part of the target model in the preceding synchronization, or finding an object of the preceding synchronization which is no longer part of the proposed model, wherein the found object includes a relationship being part of the proposed model and the target model or an attribute having different values in the proposed model and the target model;
   presenting the determined conflict and solutions to resolve the determined conflict to the user via an graphical user interface, wherein the solutions are represented as a sequence of operations on the proposed model;
   selecting a solution of the solutions from the user to resolve the determined conflict;
   applying the selected solution to at least one of the target model or the proposed model to resolve the conflict; and
   storing the proposed model after making the change as a new version or a second state in the target data structure.

7. The system of claim 6, wherein the guided structure synchronizer comprises:
   a mapping component to generate the proposed model from the source model that is based on the source data structure.

8. The system of claim 6, wherein the guided structure synchronizer comprises:

a modifier component to apply the operation to the proposed model and to reorganize the proposed model in response to user input.

9. The system of claim 6, wherein the guided structure synchronizer comprises:
a comparer to identity conflicts between the source data structure and the target data structure.

10. A non-transitory computer-readable medium, having instructions stored therein, which when executed cause a computer to perform a set of operations comprising:
generating a source model based on a source data structure and a source data structure format;
generating a target model based on a first state of a target data structure and the target data structure format, wherein the first state being any one of a state stored by a preceding synchronization or a state resulting from updating source specific synchronized data;
obtaining a proposed model based on a first state of reorganizing the source model and the target model;
receiving, from a user, information specifying a change to the proposed model, wherein the information presenting the change to the proposed model includes an operation specifying at least one of inserting, deleting, or changing a relation or an attribute of objects to the proposed model;
determining, by a computing processor, a conflict based on a comparison of the proposed model and the target model, wherein the determined conflict including at least one of finding an object which has not been part of the target model in the preceding synchronization, or finding an object of the preceding synchronization which is no longer part of the proposed model, wherein the found object includes a relationship being part of the proposed model and the target model or an attribute having different values in the proposed model and the target model;
presenting the determined conflict and solutions to resolve the determined conflict to the user via an graphical user interface, wherein the solutions are represented as a sequence of operations on the proposed model;
selecting a solution of the solutions from the user to resolve the determined conflict;
applying the selected solution to at least one of the target model or the proposed model to resolve the conflict; and
storing an operation representing the change to the proposed model; and
storing the proposed model after making the change as a new version or a second state in the target data structure.

11. The non-transitory computer-readable medium of claim 10, having further instructions stored therein, which when executed cause the computer to perform further operations comprising:
maintaining target specific additional data after a preceding synchronization.

12. The non-transitory computer-readable medium of claim 10, further comprising:
transferring target specific data from the target data structure to the proposed model.

13. The non-transitory computer-readable medium of claim 10, having further instructions stored therein, which when executed cause the computer to perform further operations comprising:
storing the mapped relationship between an object of the source model and an object of the proposed model.

14. The non-transitory computer-readable medium of claim 10, wherein the information includes at least one of the operations stored during a preceding synchronization, a solution to a conflict selected by the user or a computer system in response to presenting the conflict, or an input by the user through the user interface in response to a review of the proposed model.

* * * * *